US011472166B2

(12) United States Patent
Ackermans et al.

(10) Patent No.: US 11,472,166 B2
(45) Date of Patent: Oct. 18, 2022

(54) MULTILAYER STRUCTURE

(71) Applicant: BOREALIS AG, Vienna (AT)

(72) Inventors: Nina Ackermans, Tessenderlo (BE); Paulo Cavacas, Coutada (PT); Willem De Wever, Hasselt (BE); Auli Nummila-Pakarinen, Porvoo (FI)

(73) Assignee: BOREALIS AG, Vienna (AT)

( * ) Notice: Subject to any disclaimer, the term of this patent is extended or adjusted under 35 U.S.C. 154(b) by 444 days.

(21) Appl. No.: 16/303,837

(22) PCT Filed: May 8, 2017

(86) PCT No.: PCT/EP2017/060896
§ 371 (c)(1),
(2) Date: Nov. 21, 2018

(87) PCT Pub. No.: WO2017/207221
PCT Pub. Date: Dec. 7, 2017

(65) Prior Publication Data
US 2019/0299574 A1    Oct. 3, 2019

(30) Foreign Application Priority Data

Jun. 3, 2016 (EP) ..................... 16172879

(51) Int. Cl.
| | |
|---|---|
| B23B 27/08 | (2006.01) |
| B32B 27/30 | (2006.01) |
| B32B 7/12 | (2006.01) |
| B32B 7/03 | (2019.01) |
| B32B 7/10 | (2006.01) |
| B32B 27/32 | (2006.01) |
| B29C 48/21 | (2019.01) |
| B32B 27/08 | (2006.01) |
| B32B 37/15 | (2006.01) |
| B29C 48/154 | (2019.01) |
| B29C 48/00 | (2019.01) |
| B32B 38/00 | (2006.01) |
| B29K 23/00 | (2006.01) |
| B29C 48/92 | (2019.01) |

(52) U.S. Cl.
CPC ............ *B32B 27/08* (2013.01); *B29C 48/154* (2019.02); *B29C 48/21* (2019.02); *B32B 7/12* (2013.01); *B32B 27/30* (2013.01); *B32B 27/306* (2013.01); *B32B 27/32* (2013.01); *B32B 27/327* (2013.01); *B32B 37/153* (2013.01); B29C 48/0018 (2019.02); B29C 48/92 (2019.02); B29C 2948/92704 (2019.02); B29C 2948/92876 (2019.02); B29K 2023/06 (2013.01); B29K 2023/086 (2013.01); B32B 2038/0028 (2013.01); B32B 2250/05 (2013.01); B32B 2250/246 (2013.01); B32B 2307/516 (2013.01); B32B 2307/518 (2013.01); B32B 2307/7244 (2013.01); B32B 2307/7246 (2013.01); B32B 2309/02 (2013.01)

(58) Field of Classification Search
None
See application file for complete search history.

(56) References Cited

U.S. PATENT DOCUMENTS

| | | |
|---|---|---|
| 6,602,455 B1 | 8/2003 | Forloni |
| 8,137,774 B2 | 3/2012 | Kendig et al. |
| 2008/0178768 A1 | 7/2008 | Breese |
| 2009/0035594 A1* | 2/2009 | Lee .................... C09J 123/0853 |
| | | 428/476.9 |
| 2010/0028661 A1 | 2/2010 | Holzmueller et al. |
| 2016/0060425 A1 | 3/2016 | Falla et al. |

FOREIGN PATENT DOCUMENTS

| | | |
|---|---|---|
| CN | 1110983 A | 11/1995 |
| CN | 1067631 C | 6/2001 |
| CN | 1929985 A | 3/2007 |
| EP | 129368 | 12/1984 |
| EP | 260130 | 3/1988 |
| EP | 423101 | 4/1991 |
| EP | 537130 | 4/1993 |
| EP | 0801096 A1 | 10/1997 |
| EP | 1378528 | 1/2004 |
| EP | 1398149 A1 | 3/2004 |
| EP | 1777238 | 4/2007 |
| EP | 2067799 | 6/2009 |
| JP | S57182435 A | 11/1982 |
| JP | H02289345 A | 11/1990 |
| JP | H06328541 A | 11/1994 |

(Continued)

OTHER PUBLICATIONS

International Search Report for PCT/EP2017/060896 dated Jul. 27, 2017, 12 pages.
Formosa Plastics: "Polyethylene Film Processing Guide Quality, Value and Performance our Guiding Principles", Sep. 19, 2004, pp. 1-8.
Qenos: "Extrusion Coating & Lamination", Jun. 11, 2015, 24 pages.
Vieweg et al.: "Polyolefine", Carl Hanser Verlag Munchen 1969, 14 pages.
English Translation of Office Action for Japanese Patent Application No. 2018-559764, dated Nov. 26, 2019, 3 pages.
English Translationof Office Action for Chinese Patent Application No. 201780031797.3, dated Feb. 2, 2021, 8 pages.

(Continued)

*Primary Examiner* — Sheeba Ahmed
(74) *Attorney, Agent, or Firm* — Lowenstein Sandler LLP

(57) ABSTRACT

The present invention deals with a multilayer structure comprising a first polyethylene layer as a first external layer. The first polyethylene layer is oriented in at least machine direction. The structure also comprises a second polyethylene layer as a second external layer. It further comprises a layer made of a copolymer of ethylene and vinyl alcohol (EVOH) between the first external layer and the second external layer and a tie layer on each side of the EVOH layer. Furthermore, the tie layers comprise one or more copolymers of ethylene.

20 Claims, No Drawings

(56) References Cited

FOREIGN PATENT DOCUMENTS

| | | |
|---|---|---|
| JP | 2005161537 A | 6/2005 |
| JP | 2005161538 A | 6/2005 |
| JP | 2006007529 A | 1/2006 |
| WO | WO1997028170 | 8/1997 |
| WO | WO1997036942 | 10/1997 |
| WO | WO1998046616 | 10/1998 |
| WO | WO1998049208 | 11/1998 |
| WO | 1998056572 | 12/1998 |
| WO | WO1998056831 | 12/1998 |
| WO | WO1999012981 | 3/1999 |
| WO | WO1999019335 | 4/1999 |
| WO | WO1999041310 | 8/1999 |
| WO | WO1999051649 | 10/1999 |
| WO | WO1999058584 | 11/1999 |
| WO | WO2000034341 | 6/2000 |
| WO | WO2002002323 | 1/2002 |
| WO | WO2003066699 | 8/2003 |
| WO | WO2004000933 | 12/2003 |
| WO | WO2004011517 | 2/2004 |
| WO | WO2005002744 | 1/2005 |
| WO | WO2006066952 | 6/2006 |
| WO | WO2006083515 | 8/2006 |
| WO | WO2007003322 | 1/2007 |
| WO | WO2007065644 | 6/2007 |
| WO | WO2007104513 | 9/2007 |
| WO | WO2008082511 | 7/2008 |
| WO | WO2008089979 | 7/2008 |
| WO | WO2009080710 | 7/2009 |
| WO | 2012003042 A1 | 1/2012 |
| WO | WO2013083285 | 6/2013 |
| WO | WO2013132009 | 9/2013 |
| WO | WO2013178241 | 12/2013 |
| WO | WO2013178242 | 12/2013 |
| WO | 2014016221 | 1/2014 |
| WO | 2014026949 A1 | 2/2014 |
| WO | WO2017102704 | 6/2017 |

OTHER PUBLICATIONS

Vieweg et al., "Kunststoff-Handbuch Band IV: Polyolefine," Carl Hanser Verlag Munchen, 1969, Engilsh translation of section 2.2.1.3 and 2.2.1.4, 18 pages.

English Translation of Chinese Office Action for Application No. 201780031797.3 dated Mar. 25, 2020.

Office Action for Indian Patent Application No. 201817046196, dated Mar. 12, 2020, 6 pages.

Soamol E13803RB Technical Data Sheet, Mitsubishi Chemical Corporation, Oct. 1, 2021, 3 pages.

Grilon CF 6 S Technical Data Sheet, EMS Grivory, Aug. 2002, 5 pages.

Ametek-Mocon, "Aquatran and Permatran-W Water Vapor Permeation Analyzers", Product Family Brochure, published by MOCON, Inc., 7 pages.

ASTM International, "Standard Test Method for Water Vapor Transmission Rate Through Plastic Film and Sheeting Using a Modulated Infrared Sensor", Designation: F 1249-06, Jun. 22, 2005, 6 pages.

Ametek-Mocon, "Ox-Tran Oxygen Permeation Analyzers", OTR Testing for Barrier Films & Packages, Product Family Brochure, published by MOCON, Inc., 7 pages.

ASTM International, "Standard Test Method for Oxygen Gas Transmission Rate Through Plastic Film and Sheeting Using Coulometric Sensor", Designation D 3985-05, 8 pages.

ASTM International, "Standard Test Method for Determination of Oxygen Gas Transmission Rate, Permeability and Permeance at Controlled Relative Humidity Through Barrier Materials Using a Coulometric Detector", Designation F Jul. 1927, 6 pages.

polybase.com, Ethylene vinyl alcohol copolymer E-151 product information, web page search done Jan. 19, 2022, 2 pages.

Office Action for Japanese Patent Application No. 2018-559764 dated Aug. 30, 2022 with English Translation, 45 pages.

\* cited by examiner

MULTILAYER STRUCTURE

CROSS-REFERENCE TO RELATED APPLICATIONS

This application is a national phase entry under 35 U.S.C. § 371 of International Application No. PCT/EP2017/060896, filed on May 8, 2017, which claims the benefit of priority of European Patent Application No. 16172879.5, filed on Jun. 3, 2016. The contents of these applications are hereby incorporated by reference herein in their entirety.

FIELD OF THE INVENTION

The present invention is directed to a multilayer structure. More specifically, the present invention is directed to a multilayer structure which provides oxygen barrier and which can be recycled. In particular, the present invention is directed to a recyclable polyethylene multilayer structure providing oxygen barrier. The present invention is further directed to a process for producing the multilayer structure by lamination or extrusion coating process.

PROBLEM TO BE SOLVED

It is known in the art that the copolymers of ethylene and vinyl alcohol, often called EVOH, have good barrier properties against oxygen.

The document US-A-2016/0060425 discloses typical PE/EVOH structures in comparative examples Films 3.2 and 3.3. The films 3.2 and 3.3 are nine-layer structures (including tie layers). Such films have good barrier properties, but their use in post-processing operations, such as orientation, is problematic. For instance, the EVOH layer may crack during orientation thus resulting in loss of barrier properties.

It is also known to produce barrier films by lamination, for instance, by adhesive lamination. Such process is disclosed, for instance in Patent Application No. PCT/EP2016/080756. The adhesives used in these structures are typically not PE-based. The structure further includes a metal or ceramic layer. This may cause problems in recycling.

SUMMARY OF THE INVENTION

As seen from one aspect of the invention the present invention provides a multilayer structure comprising (i) a polyethylene film layer as a first external layer, said polyethylene film layer being oriented in at least machine direction; (ii) a polyethylene layer as a second external layer; (iii) a layer made of a copolymer of ethylene and vinyl alcohol (EVOH) between the first external layer and the second external layer; and (iv) a tie layer on each side of the EVOH layer.

As seen from another aspect, the present invention provides a process for producing a multilayer structure as defined above, said process comprising the steps of: (I) providing a substrate, wherein the substrate is a polyethylene film which has been oriented in at least machine direction; (II) coextruding onto the substrate (II-1) a layer of a copolymer of ethylene and vinyl alcohol; (II-2) a layer of polyethylene; and (II-3) tie layers on both sides of the layer of the copolymer of ethylene and vinyl alcohol, wherein the layer of the copolymer of ethylene and vinyl alcohol is between the substrate and the polyethylene layer, thereby producing the multilayer structure.

As seen from a further aspect, the present invention provides a process for producing a multilayer structure as defined above, said process comprising the steps of: (a) providing a first polyethylene film which first polyethylene film has been oriented in at least machine direction; (b) providing a second polyethylene film; (c) coextruding (c-1) a layer of a copolymer of ethylene and vinyl alcohol between the first polyethylene film and the second polyethylene film; and (c-2) tie layers on both sides of the layer of the copolymer of ethylene and vinyl alcohol; and (d) pressing the first polyethylene film and the second polyethylene film together thereby producing the multilayer structure.

DETAILED DESCRIPTION

General

In addition to the polymers the polymer layers may also comprise, and preferably comprise, additives, such as antioxidants, process stabilisers, antiblock agents, lubricants, acid scavengers, pigments and the like.

Antioxidants and stabilisers are used for stabilising the polymer against oxidation. The group of antioxidants includes sterically hindered phenols (phenolic AO); phosphites and phosphonites; sulphur containing AO; alkyl radical scavengers; aromatic amines; hindered amine stabilisers (mainly known as UV-stabilisers), HAS; and combinations of two or more of the above-mentioned substances.

Sterically hindered phenols are added to give long term stability in finished product. This is measured by performing oven ageing test, which is an accelerated test, and from this lifetime is calculated at the use temperature (so called Arrhenius plot). In addition phenols contribute to process-stability. In some occasions only a phenol is added as the stabiliser but this is not common.

Phosphites and phosphonites give protection during processing. They react with hydroperoxides to prevent chain scission or combination from taking place. They are not very efficient alone and normally they are used in blends with phenolic AO. This so called synergistic blend gives a good processing stabilisation.

Antiblocking and slip agents may be used for improving the handling properties of the film.

Slip agents migrate to the surface and act as lubricants polymer to polymer and polymer against metal rollers, giving reduced coefficient of friction (CoF) as a result. Antiblocking agents are added to cause a slight surface roughness that prevents the film sticking to itself.

Both erucamide and oleamide are used as slip agents. Oleamide may be quicker at the surface due to lower Mw, but when equilibrium is reached erucamide normally give slightly better slip-effect at same concentration.

Different minerals, such as talc, natural silica and synthetic silica, are used as antiblocking agents for films.

Acid scavengers are used for deactivating acidic impurities. Most of the polyolefins contain small level of chlorine due to the catalyst residues (in the magnitude 10-20 ppm). Acid scavengers are added to protect the processing equipment against corrosion caused by hydrochloric acid. The main product used is Ca-stearate.

Lubricants may be used for several purposes, e.g. to improve output, to eliminate melt fracture, to give higher gloss, go give "internal lubrication", etc. In addition acid scavengers may be added in surplus to give lubrication.

Different pigments may be used if a certain colour is required. The pigments are well known in the industry and the pigment is selected based on the desired colour. For instance, titanium oxide may be used for white colour, carbon black for black colour and ultramarine blue for blue colour. The pigments are typically added as masterbatches.

First Polyethylene Layer

The structure comprises a polyethylene film layer, which polyethylene film has been oriented in at least machine direction. In the description of the structure this is referred to as the first polyethylene layer. In the context of extrusion coating process this layer is referred to as the substrate. In the context of extrusion lamination process this layer is referred to as the first polyethylene film.

The first polyethylene layer, as discussed herein, is a film or a film layer which has been substantially made of polyethylene. By "substantially made of polyethylene" is meant that the main raw materials of the film are homopolymers or copolymers of ethylene, such as high density polyethylene, medium density polyethylene, linear low density polyethylene, ethylene-based plastomers, ethylene-based elastomers, low density polyethylene, blends thereof and the like. The raw materials may contain small amount of additives and other polymers. However, the amount of polymers different from ethylene homo- and copolymers is typically not more than 10% by weight, preferably not more than 5% by weight and especially preferably not more than 2% by weight, such as not more than 1% by weight. Furthermore, the first polyethylene layer may be a multi-layer film comprising more than one layer. However, when the first polyethylene layer comprises multiple layers the whole structure preferably is substantially made of polyethylene.

The first polyethylene layer is thus a film layer which has been oriented in at least machine direction, optionally also in the transverse direction. Preferably the film layer is oriented only in machine direction.

The first polyethylene layer of the structure according to the present invention comprises at least one layer A.

Layer A:

Layer A is based on polyethylene polymer having a density of 890 to 980 kg/m$^3$.

The polyethylene may be a homopolymer or it may be a copolymer. As the polyethylene may have a density of from 890 to 980 kg/m$^3$, it may be for example a high density polyethylene (HDPE), a medium density polyethylene (MDPE) or a linear low density polyethylene (LLDPE) or blends with high pressure low density polyethylene (LDPE) or with an ethylene based plastomer or a blend of an ethylene based plastomer with high pressure low density polyethylene (LDPE)

Preferred polyethylenes for use in the manufacture of layer A of the first polyethylene layer are LLDPE's.

MFR$_2$ (190° C., 2.16 kg, ISO 1133) of suitable LLDPE's is in the range 0.01 to 20 g/10 min, preferably in the range of 0.05 to 10 g/10 min, more preferably in the range of 0.1 to 6.0 g/10 min and even more preferably in the range of 0.1 to 5.0 g/10 min.

The LLDPE of layer A of the first polyethylene layer may have a density in the range of 910 to 950 kg/m$^3$, preferably 920 to 945 kg/m$^3$, such as 930 to 940 kg/m$^3$.

The weight average molecular weight Mw of the LLDPE is preferably in the range of 100 000 to 200 000 g/mol.

The Mw/Mn of the LLDPE can be in a quite broad range. Preferred Mw/Mn values are 3 or more, such as 6 or more, even 10 or more. Ranges of 3.5 to 30 are envisaged.

The LLDPE contains at least one or two comonomer(s). Suitable comonomers are C3-C10 alpha-olefin comonomers. Thus the LLDPE can be a copolymer of ethylene and one C3-C10 alpha-olefin comonomer or a terpolymer of ethylene and two different C3-C10 alpha-olefin comonomers.

Preferably the comonomers are selected from the group of 1-butene, 1-hexene and 1-octene. It is preferred if the comonomer employed is 1-butene and/or 1-hexene. Preferred terpolymers comprise 1-butene and 1-hexene comonomers.

The overall comonomer content in the total polymer is 0.3 to 7.0% by mol, preferably 0.6 to 4.5% by mol, more preferably 1.0 to 3.5% by mol and most preferably 1.2 to 2.3% by mol.

If the LLDPE is a terpolymer of ethylene and two different C3-C10 alpha-olefin comonomers, preferably 1-butene and 1-hexene, 1-butene is present in an amount of 0.1 to 3.0% by mol, preferably 0.2 to 2.0% by mol, more preferably 0.3 to 1.5% by mol and most preferably 0.4 to 0.8% by mol and hexene is present in an amount of 0.2 to 4.0% by mol, preferably 0.4 to 2.5% by mol, more preferably 0.7 to 2.0% by mol and most preferably 0.8 to 1.5% by mol.

The LLDPE can be unimodal or multimodal, preferably multimodal. A unimodal LLDPE possesses a single peak in its GPC spectrum as it is made in a single stage process. It is most preferred if the LLDPE is a multimodal LLDPE formed from a homopolymer component and a copolymer component. These polymers are well known in the art and are available from Borealis and others, such as films under trade names Borshape™ and Borstar™. Films made of those LLDPEs, and which are oriented in machine direction, are known to have good tear resistance not only in transverse direction but also in machine direction.

Preferably such multimodal, like bimodal LLDPEs are produced in a multi-stage polymerization using the same catalyst. Thus, two slurry reactors or two gas phase reactors could be employed. Preferably however, such multimodal, like bimodal LLDPEs are made using a slurry polymerization in a loop reactor followed by a gas phase polymerization in a gas phase reactor.

The LLDPE suitable for the invention can be produced using Ziegler Natta catalysis or single site catalysis (mLL-DPE), but is preferably produced using a Ziegler Natta catalyst. Such catalysts are well known in the art.

Suitable films, LLDPE resins for producing such films and their production are disclosed, among others in WO-A-2004/000933, EP-A-1378528, WO-A-2004/011517, EP-A-2067799 and WO-A-2007/003322.

Suitable HDPE has a density within the range of 940 up to 980 kg/m$^3$, preferably of about 945 kg/m$^3$ to about 965 kg/m$^3$. More preferably, the density is within the range of about 950 kg/m$^3$ to about 965 kg/m$^3$.

Preferably the HDPE is a unimodal HDPE.

HDPEs of use in the invention can be homopolymers or copolymers with at least one alpha-olefin having from 3 to 10 carbon atoms.

The melt flow rate (MFR) of the HDPE polymer to be employed for layer B in accordance with the present invention is not critical and can be varied depending on the mechanical properties desired for an end application.

In one preferable embodiment MFR$_2$ value in the range of from 0.05 to 10 g/10 min, preferably from 0.1 to 7.0 g/10 min, more preferably from 0.2 to 5.0 g/10 min, yet more preferably from 0.3 to 3.0 g/10 min, even more preferably from 0.4 to 2.0 g/10 min and most preferably from 0.5 to 1.3 g/10 min are desired.

The molecular weight distribution (MWD) expressed as Mw/Mn of the HDPE polymer to be employed in accordance with the present invention can be in a broad range. MWD is preferably in the range from 2 to 20, preferably 2.5 to 15, more preferably 3 to 10 and most preferably 3.5 to 7.

The HDPE polymer to be employed in accordance with the present invention may be a known and e.g. commercially available, polyethylene polymer or said HDPE polymer may be prepared using any coordination catalyst, typically ZN catalysts, Cr-catalyst as well as single site catalysts (SSC) in well-documented polymerization processes.

Suitable films, HDPE resins for producing such films and their production are disclosed, among others in WO-A-1999/058584, WO-A-1999/051649, WO-A-2007/104513 and WO-A-2007/065644.

Layer A of the first polyethylene layer may of course contain a blend of different components, like the combination of a tubular or autoclave (high pressure) low density polyethylene (LDPE) and an LLDPE or the combination of unimodal and bimodal LLDPE polymers or a blend of tubular or autoclave (high pressure) LDPE as defined above and/or LLDPE and an ethylene based plastomer with a density below 915 kg/m³.

Suitable plastomers used in the layer A of the first polyethylene layer are ethylene based plastomers with a density below 915 kg/m³. The ethylene-based plastomer is a copolymer of ethylene and propylene or a C4-C10 alpha olefin. Suitable C4-C10 alpha-olefin include 1-butene, 1-hexene and 1-octene, preferably 1-butene or 1-octene and more preferably 1-octene. Preferably copolymers of ethylene and 1-octene are used.

Suitable ethylene based plastomers have a density in the range of 860 to 915 kg/m³, preferably in the range of 870 to 910 kg/m³.

The $MFR_2$ (ISO 1133; 190° C.; 2.16 kg) of suitable ethylene based plastomers is in the range of 0.01 to 20 g/10 min, preferably in the range of 0.05 to 10 g/10 min, more preferably in the range of 0.1 to 6.0 g/10 min and even more preferably in the range of 0.1 to 5.0 g/10 min.

The melting points (measured with DSC according to ISO 11357-3:1999) of suitable ethylene based plastomers are below 130° C., preferably below 120° C., more preferably below 110° C. and most preferably below 100° C. Furthermore suitable ethylene based plastomers have a glass transition temperature Tg (measured with DMTA according to ISO 6721-7) of below −25° C., preferably below −30° C., more preferably below −35° C.

In case the copolymer is a copolymer of ethylene and propylene it has an ethylene content from 10 to 55 wt %, preferably from 15 to 50 wt % and more preferably from 18 to 48 wt %. In case the copolymer is a copolymer of ethylene and a C4-C10 alpha olefin it has an ethylene content from 60 to 95 wt %, preferably from 65 to 90 wt % and more preferably from 70 to 88 wt %.

The molecular mass distribution Mw/Mn of suitable ethylene based plastomers is most often below 4, such as 3.8 or below, but is at least 1.7. It is preferably between 1.8 and 3.5.

Suitable ethylene based plastomers can be any copolymer of ethylene and propylene or ethylene and C4-C10 alpha olefin having the above defined properties, which are commercial available, i.a. from Borealis under the tradename Queo, from Dow Chemical Corp (USA) under the tradename Engage or Affinity, or from Mitsui under the tradename Tafmer.

Alternately these ethylene based plastomers can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the persons skilled in the art.

Preferably these ethylene based plastomers are prepared by a one stage or two stage solution polymerization process, especially by high temperature solution polymerization process at temperatures higher than 100° C. Such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110°, more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a 05-12-hydrocarbon which may be unsubstituted or substituted by C1-4 alkyl group such as pentane, methyl pentane, hexane, heptane, octane, cyclohexane, methylcyclohexane and hydrogenated naphtha. More preferably unsubstituted C6-10-hydrocarbon solvents are used. Such processes are disclosed, among others, in WO-A-1997/036942, WO-A-2006/083515, WO-A-2008/082511, and WO-A-2009/080710.

The polyethylene of layer A may also contain antioxidants, process stabilizers, slip agents, pigments, UV-stabilizers and other additives known in the art.

Layer B

The first polyethylene layer of the structure according to the present invention comprises optionally at least one further layer, being layer B.

Layer B can be made of high density polyethylene (HDPE) having a density of 940 up to 970 kg/m³ or of a medium density polyethylene (MDPE) having a density of 925 up to 940 kg/m³ or a linear low density polyethylene (LLDPE) having a density of 910 up to 950 kg/m³ or blends thereof or with plastomers.

Suitable MDPE preferably has a density within the range of about 930 kg/m³ to about 940 kg/m³. Preferred MDPE is a copolymer that comprises from about 85 wt % to about 98 wt % of recurring units of ethylene and from about 2 wt % to about 15 wt % of recurring units of a C3 to C10 alpha-olefin. Suitable C3 to C10 alpha-olefins include propylene, 1-butene, 1-pentene, 1-hexene, 4-methyl-1-pentene, and 1-octene, the like, and mixtures thereof. Preferably, the MDPE has a bimodal or multimodal molecular weight distribution. Method for making bimodal or multimodal MDPE is known, for instance, from WO-A-1999/041310 and WO-A-2008/089979.

Suitable HDPE are those as already described for layer A.

Suitable LLDPEs are those as already described for layer A.

The MDPE or HDPE or LLDPE of layer B may also contain minor amounts of conventional additives such as antioxidants, UV stabilisers, acid scavengers, nucleating agents, anti-blocking agents, slip agents etc. as well as polymer processing agent (PPA). The additives can be added as single components or as part of a masterbatch as is known in the art.

The Structure of the First Polyethylene Layer

The film forming the first polyethylene layer can be a monolayer film, thus being composed of layer A only.

The film forming the first polyethylene layer can also be a multi-layered film. Multilayer films are preferably formed from at least two layers, ideally at least three layers, such as 3 layers, 5 layers or 7 layers. Such films preferably comprise therefore at least adjacent layers A and B, preferably A, B and E. In case the film forming the first polyethylene layer is a multilayer film, the film comprises at least layer A and layer B, optionally in combination with layer E.

If the multilayer film comprises a layer E, this layer can be made of high density polyethylene (HDPE) having a density of 940 up to 970 $kg/m^3$ or of a medium density polyethylene (MDPE) having a density of 925 up to 940 $kg/m^3$ or of a linear low density polyethylene (LLDPE) having a density of 910 up to 950 $kg/m^3$, as defined for layer B, or blends thereof or with plastomers.

Layer E may be the same as layer B or may be different from layer B.

Layer E may also contain minor amounts of conventional additives such as antioxidants, UV stabilisers, acid scavengers, nucleating agents, anti-blocking agents, slip agents etc. as well as polymer processing agent (PPA). The additives can be added as single components or as part of a masterbatch as is known in the art.

Such a film has the structure E/A/B and is unblocked.

The film thickness distribution (%) of an E/A/B layer film is preferably 10 to 40%/20 to 80%/10 to 40%, preferably 12 to 30%/40 to 76%/12 to 30%, of the total film thickness (100%).

The film forming the first polyethylene layer according to the present invention can also have 5 or 7 layers, whereby the additional layers can be made of any polyethylene.

In one embodiment of the invention it is nevertheless preferred to use a blocked film structure as first polyethylene layer.

In this case the first polyethylene layer has the structure E/A/BL/BL/A/B or E/A/A/A/BL/BL/A/A/A/B, wherein BL is the blocking layer and layers A, B and E are defined as described above and layer E is identical to layer B.

For an E/A/BL/BL/A/B film structure the thickness of the layers may conform to 7.5-27.5%/15-35%/5-25%/15-35%/7.5-27.5%, wherein the total film thickness is 100% and the amount of blocking layer is the sum of two layers (BL).

The blocking layer (BL) in this case composes of a blend of a LLDPE as described above for the layer A and of a plastomer, as described above; or of a blend of the LDPE, as described above, and an ethylene-based plastomer with a density below 915 $kg/m^3$ as described above.

The plastomer is preferably present in the blends in an amount of 20 to 80 wt %, more preferably in an amount of 40 to 75 wt % and even more preferably in an amount of 50 to 70 wt %. In principle any blend ratio is suitable, as long as the blend fulfils its task as blocking layer.

It is also possible to use 100 wt % plastomer for the blocking layer or any other PE based material known in the state of the art for being suitable in blocking layers, like EVA, EBA, mPE, etc.

Film Preparation

Any blend used in the above-described layers can be produced by any suitable melt mixing process at temperatures above the melting point of the respective blend. Typical devices for performing said melt mixing process are twin screw extruders, single screw extruders optionally combined with static mixers, chamber kneaders like Farrel kneaders, Banbury type mixers and reciprocating co-kneaders like Buss co-kneaders. Preferably, the melt mixing process is carried out in a twin screw extruder with high intensity mixing segments and preferably at a temperature of 170 to 270° C., more preferably of 180 to 250° C.

It is also possible to produce the blend of the LLDPE or the LDPE and the plastomer by dry-blending in a suitable mixing equipment, like horizontal and vertical agitated chambers, tumbling vessels, and Turbula mixers, as long as sufficient homogeneity is obtained.

The three-layer structure in accordance with the present invention may be prepared by any conventional film extrusion procedure known in the art, e.g. with blown film extrusion. Preferably, the three-layer film is formed by blown film extrusion, more preferably by co-extrusion processes, which in principle are known and available to the skilled person.

Typical processes for preparing a three-layer structure in accordance with the present invention are extrusion processes through an annular die. A bubble is formed by blowing air inside the tube formed by the film, thereby cooling the film. The bubble is collapsed between the rollers after solidification. This film can then be slid, cut or converted, such as by using a gazette head, as desired. Conventional film production techniques may be used in this regard. Typically layer A and layers B and C are coextruded at a temperature of from 160 to 240° C. and cooled by blowing gas (generally air) at a temperature of 5 to 50° C., to provide a frost line height of 1 or 2 to 8 times the diameter of the dye. The blow up ratio can be in the range of from 1 (1:1) to 4 (1:4), preferably 1.5 (1:1.5) to 3.5 (1:3.5), more preferably from 2 (1:2) to 3 (1:3).

The film preparation process steps of the invention are known and may be carried out in one film line in a manner known in the art. Such film lines are commercially available, for example from Windmoller & Holscher, Reifenhauser, Hosokawa Alpine, etc.

Typically the three-layer structure (E/A/B) is produced on a 3-layer co-extrusion line, but in some embodiments it may be appreciated that the used co-extruder is a 5 or 7 layer co-extrusion line.

In such a set up the central dies may all extrude A-layer material to form an E/A/A/A/B or E/A/A/A/A/A/B type film or each of the two, respectively three outer dies may extrude outer layer-layer material to form an E/E/A/B/B or E/E/E/A/B/B/B type film or as a combination of the before described possibilities an E/E/A/A/A/B/B type film could be produced, too. As all these outer (B and E layers)—respectively A-layers are identical, the films produced are effectively still E/A/B films.

Such 5-layer or 7-layer co-extrusion lines can also be used to produce the following structures:

A/A/A/A/A or A/A/A/A/A/A/A, which are still monolayer films as the A-layers are identical.

A/B/B/B/A or A/A/B/A/A or A/A/B/B/B/A/A, etc., which are still two-layer films.

If the first polyethylene layer includes additional layers to layer A, B and E, like layer F and/or layer G the film structure may look like E/F/A/G/B and any combinations thereof, which are possible on a 5-layer or 7-layer co-extrusion line.

Blocked Film Structure

For the blocked film B (or E)/A/BL type structure is used, where B (or E) is one of the outer layers (E or B being the same in the blocked structure), A is the core layer and layer BL is the blocking layer. As the three layer coextruded film exits the die in the form of a bubble, the bubble is cut and then two halves forced together to effectively form an B/A/BL/BL/A/B type structure (i.e. the formed bubble is collapsed e.g. at the nip rolls to form said film). In this way, the film thickness is effectively doubled and the desired initial film thickness achieved. This is called film blocking in the art.

Thus, the B/A/BL/BL/A/B film is formed from two identical B (or E)/A/BL films laminated together via their (BL) layers.

For the B/A/A/A/BL/BL/A/A/A/B film two identical B/A/A/A/BL films were produced on a 5-layer co-extrusion line and the resulting bubble is collapsed to form the corresponding blocked film structure.

In addition it is also possible to use other combinations of layers A, B, E and/or F or G with blocking layer BL to produce the film forming the first polyethylene layer as a blocked film structure.

The film forming the first polyethylene layer is oriented at least in the machine direction according to the present invention.

The obtained monolayer or multilayer film is subjected to a subsequent stretching step, wherein the film is stretched in the machine direction (MDO). Stretching may be carried out by any conventional technique using any conventional stretching devices which are well known to those skilled in the art.

The MDO process can be done in-line, wherein the MDO unit is directly linked to the blown film unit, i.e. the film leaving the blown film line is directly transferred in the MDO unit.

The MDO process can also be done off-line, wherein the MDO unit is an autonomous unit. In this case the film leaving the blown film line is first wound on a winder and is then supplied to the off-line MDO unit, where the film has to be un-wind on a un-winder unit before it can be stretched.

If blocked film structures are used, the MDO process is preferably done in-line.

During the MDO, the film obtained from the blown-film line is heated to an orientation temperature. Preferably, the temperature range for orientation can be 25° C. below the VICAT A-level of the (outer) film layer material up to the melting temperature of the (outer) film layer material. The heating is preferably performed utilizing multiple heating rollers.

Next, the heated film is fed into a slow drawing roll with a nip roller, which has the same rolling speed as the heating rollers. The film then enters a fast drawing roll. The fast drawing roll has a speed that is 2 to 10 times faster than the slow draw roll, which effectively orients the film on a continuous basis.

The oriented film then enters annealing thermal rollers, which allow stress relaxation by holding the film at an elevated temperature for a period of time.

The annealing temperature is preferably within the same temperature range as used for stretching or slightly below thereof (e.g. 10 to 20° C. below), with room temperature being the lower limit. Finally, the film is cooled through cooling rollers to an ambient temperature.

The ratio of the film thickness before and after orientation is called "drawdown ratio" or stretch ratio. The stretch ratio varies depending on many factors including the desired film thickness, film properties, and multilayer film structures.

The preparation process of the uniaxially oriented in MD monolayer or multilayer film useful in the invention comprises at least the steps of forming the monolayer or multilayer film and stretching the obtained monolayer or multilayer film in the machine direction in a draw ratio of of 1:1.5 to 1:12, preferably in the range of 1:2.0 to 1:10, more preferably in the range of 1:3.0 to 1:8.

The film is stretched 1.5 to 12 times up its original length in the machine direction. This is stated herein as a stretch ratio of 1:1.5 to 1:12, i.e. "1" represents the original length of the film and "1.5" or "12" denotes that it has been stretched to 1.5 or 12 times that original length.

An effect of stretching (or drawing) is that the thickness of the film is similarly reduced. Thus a stretch ratio of 1:1.5 or 1:12 typically also means that the thickness of the resulting film is from 1/1.5 to 1/12 of the original thickness.

After orientation, the film forming the first polyethylene layer has a film thickness of 5 to 100 µm, preferably 10 to 80 µm and more preferably 10 to 40 µm. This means that, for example, using a stretch ratio of 1:3 to yield a 40 µm film needs a primary film of 120 µm and using a stretch ratio of 1:12 to yield a 40 µm film needs a primary film of 480 µm.

The film forming the first polyethylene layer (i.e. the MDO film) is preferably characterized by the following properties:

i) a tensile modulus (according to ISO 527-3) in machine direction measured at room temperature of at least 800 MPa, more preferably of at least 1000 MPa, still more preferably of at least 1200 MPa and most preferably of at least 1500 MPa ii) a tensile modulus (according to ISO 527-1 and 527-3) in machine direction measured at 70° C. of at least 100 MPa, more preferably of at least 110 MPa, still more preferably of at least 120 MPa and most preferably of at least 150 MPa iii) a ratio of i) to ii) of not more than 10

The first polyethylene layer may not be glossy if there is no such requirement by the end-use of the film but if the end-use requires the film to be glossy, then the first polyethylene layer preferably has:

iv) a gloss)(20° according to ASTM D2457 of at least 30%, more preferably of at least 40%, still more preferably of at least 50% and most preferably of at least 60%.

If haze of the first polyethylene layer is not important for the desired application, then haze can be also up to 100%, but if haze should be low or relatively low for the desired application then the first polyethylene layer preferably has v) a haze according to ASTM D1003 of below 30%, more preferably of below 25%, still more preferably of below 20% and most preferably of below 15%.

If desired the first polyethylene layer can also be biaxially oriented, thus being oriented in machine direction as well as in transverse direction (TD). Suitable draw ratios are 1:4 to 1:13, preferably in the range of 1:5.0 to 1:10, more preferably in the range of 1:5.5 to 1:8.

If the first polyethylene layer is a biaxially oriented film, then the film thickness before orientation is greater than for only using machine orientation to achieve the desired end film thickness after orientation. This is within the knowledge of the persons skilled in the art.

Preferably the first polyethylene layer is oriented only in machine direction.

Second Polyethylene Layer

The structure comprises another polyethylene film layer. In the description of the structure this is referred to as the second polyethylene layer. In the context of extrusion coating process this layer is referred to as the layer of polyethylene. In the context of extrusion lamination process this layer is referred to as the second polyethylene film.

The second polyethylene layer, as discussed herein, is a film or a film layer which has been substantially made of polyethylene. By "substantially made of polyethylene" is meant that the main raw materials of the film are homopolymers or copolymers of ethylene, as discussed above for the first polyethylene layer. Furthermore, the second polyethylene layer may be a multi-layer film comprising more than one layer. However, when the second polyethylene layer comprises multiple layers the whole structure preferably is substantially made of polyethylene.

Extrusion Coated Structure

If the structure is produced by extrusion coating then the second polyethylene layer comprises, and preferably essentially consists of, low density polyethylene. By "essentially consists of" is meant that the second polyethylene layer may contain minor amount of additives known in the art, such as antioxidants, and other polymers as long as such other polymers do not adversely influence the processability of the low density polyethylene. Typically the amount of additives and other polymers is then not more than 2% by weight, preferably not more than 1% by weight and especially preferably not more than 0.5% by weight. In any case, if the structure is produced by extrusion coating the second polyethylene layer typically comprises at least 40%, preferably at least 50%, more preferably at least 75% and especially preferably at least 90% of low density polyethylene.

The low density polyethylene typically has a melt flow rate $MFR_2$ (measured under a load of 2.16 kg at a temperature of 190° C.) of from 1 to 15 g/10 min, preferably from 2 to 10 g/10 min and even more preferably from 3 to 8 g/10 min. It further typically has a density of from 915 to 930 $kg/m^3$, preferably from 916 to 926 $kg/m^3$ and even more preferably from 917 to 925 $kg/m^3$. The low density polyethylene can be produced in an autoclave process as disclosed in EP-A-1777238 or in a tubular process as disclosed in WO-A-2013/132009, WO-A-2013/083285, WO-A-2013178241 and WO-A-2013/178242. It can also be a blend of two low density polyethylenes, one of which is produced in an autoclave process and one in a tubular process. Preferably, the low density polyethylene is produced in a tubular process.

Extrusion Laminated Structure

If the structure is produced by extrusion lamination then the second polyethylene layer is suitably a film made of polyethylene. Such film can be a cast film or a blown film, and it preferably is a blown film.

The film forming the second polyethylene layer in extrusion lamination can be produced by using the methods well known in the art when producing cast or blown films. The film suitably has a thickness of from 10 to 200 µm, preferably from 10 to 150 µm, such as from 20 to 120 µm.

When the structure is produced by extrusion lamination the second polyethylene layer may comprise any suitable polyethylene, such as high density polyethylene, medium density polyethylene, linear low density polyethylene, ethylene-based plastomers, ethylene-based elastomers, low density polyethylene, and the like. The raw materials may contain small amount of additives and other polymers. However, the amount of polymers different from ethylene homo- and copolymers is typically not more than 10% by weight, preferably not more than 5% by weight and especially preferably not more than 2% by weight, such as not more than 1% by weight. Furthermore, the second polyethylene layer may be a multi-layer film comprising more than one layer. However, when the second polyethylene layer comprises multiple layers the whole structure forming the second polyethylene layer should anyway be substantially made of polyethylene.

When the structure is produced by extrusion lamination, the film forming the second polyethylene layer may be an un-oriented film or a film being at least oriented in machine direction (MDO) and optionally also in transverse direction (TD). Preferably the film forming the second polyethylene layer is an un-oriented film or an MDO-film. More preferably the film forming the second polyethylene layer is un-oriented.

The film forming the second polyethylene layer of the extrusion laminated structure according to the present invention has a final thickness of 10 to 200 µm, preferably from 10 to 150 µm, such as from 20 to 120 µm.

The film forming the second polyethylene layer in the extrusion laminated structure preferably has at least a sealant layer C based on polyethylene having a density of 890 to 950 $kg/m^3$.

The polyethylene may be a homopolymer made in a low pressure or high pressure process (LDPE) or it may be a copolymer. As the polyethylene may have a density of from 890 to 950 $kg/m^3$, it may be a medium density polyethylene (MDPE) or a linear low density polyethylene (LLDPE), as described for layer A above, and any combinations therefrom.

Preferably the sealant layer C comprises a blend of a linear low density polyethylene (LLDPE), produced either with a Ziegler-Natta catalyst (znLLDPE) or produced with a metallocene catalyst (mLLDPE) or an ethylene-based plastomer with a low density polyethylene (LDPE).

Suitable znLLDPE are those as described for layer A above.

As used herein, the mLLDPE polymer is an ethylene copolymer having a density of 940 $kg/m^3$ or less. Preferred mLLDPE's may have a density of 905 to 940 $kg/m^3$, more preferably 910 to 937 $kg/m^3$. In one preferable embodiment even densities of 915 to 925 $kg/m^3$ are highly feasible.

The mLLDPE is formed from ethylene along with at least one C3-C20-alpha-olefin comonomer, preferably C3-C12-alpha-olefin comonomer, e.g. 1-butene, 1-hexene or 1-octene. Preferably, the mLLDPE is a binary copolymer, i.e. the polymer contains ethylene and one comonomer, or a terpolymer, i.e. the polymer contains ethylene and two or three, preferably two, comonomers. Preferably, the mLLDPE comprises an ethylene-hexene copolymer, ethylene-octene copolymer, ethylene-butene copolymer or a terpolymer of ethylene with 1-butene and 1-hexene comonomers. The amount of comonomer present in the mLLDPE is preferably 0.5 to 12 mol %, more preferably 2 to 10 mol %, and most preferably 4 to 8 mol %. Alternatively, comonomer contents present in the mLLDPE may be 1.5 to 10 wt %, especially 2 to 8 wt %.

The $MFR_2$ of mLLDPE's is preferably in the 0.01 to 20 g/10 min, more preferably 0.2 to 10 g/10 min, even more preferably 0.3 to 6.0 g/10 min, and most preferably 0.4 to 5.0 g/10 min.

The mLLDPE may be unimodal or multimodal, both are preferable. By unimodal is meant that the molecular weight profile of the polymer comprises a single peak and is produced by one reactor and one catalyst.

The unimodal mLLDPE polymers preferably possess a narrow molecular weight distribution. The Mw/Mn value is preferably 2 to 4, more preferably 2 to 3.

Multimodal can be understood as bimodal MWD or bimodal comonomer distribution (e.g. the MFR's of the components are the same, but they contain same comonomer in different amounts). Bimodal mLLDPE comprise a LMW component and a HMW component. Both the LMW and HMW components of multimodal mLLDPE are preferably copolymers of ethylene as defined above.

The molecular weight distribution, Mw/Mn, of a multimodal mLLDPE may be below 30, preferably in the range of 2-5.

Suitable mLLDPE's are available commercially from ExxonMobil Chemical, Nova, Dow, LyondellBasell, to mention a few.

Alternatively, suitable mLLDPE polymers can be produced in a known manner according to or analogously to conventional polymerization processes, including solution, slurry and gas phase processes, described in the literature of polymer chemistry. Examples are given in WO-A-2006/066952, WO-A-2002/002323, WO-A-2005/002744 and WO-A-2003/066699.

Unimodal mLLDPE, as defined above is preferably prepared using a single stage polymerization, e.g. solution, slurry or gas phase polymerization, preferably a slurry polymerization in slurry tank or, more preferably, in loop reactor in a manner well known in the art. As an example, said unimodal mLLDPE can be produced e.g. in a single stage loop polymerization process according to the principles given below for the polymerization of low molecular weight fraction in a loop reactor of a multistage process, naturally with the exception that the process conditions (e.g. hydrogen and comonomer feed) are adjusted to provide the properties of the final unimodal polymer.

Multimodal (e.g. bimodal) mLLDPE as defined above can be made by blending mechanically two or more separately prepared polymer components, or preferably, by in situ blending in a multistage polymerization process during the preparation process of the polymer components. Both mechanical and in situ blending is well known in the field.

Accordingly, preferred multimodal mLLDPE polymers are obtainable by in-situ blending in a multistage, i.e. two or more stage, polymerization process including solution, slurry and gas phase process, in any order. Alternatively said multimodal mLLDPE may be obtainable by using two or more different polymerization catalysts, including multi- or dual site catalysts, in a one-stage polymerization.

Preferably the multimodal mLLDPE as defined above is produced in at least two-stage polymerization using the same catalyst, e.g. a single site catalyst. Thus, for example two slurry reactors or two gas phase reactors, or any combinations thereof, in any order can be employed.

mLLDPE as defined above may be made using any conventional single site catalysts (SSC), which SSC catalysts include metallocenes.

All these catalysts are well known in the field. In case of mLLDPE, metallocene catalysis is preferably used herein. The preparation of the metallocene catalyst can be carried out according or analogously to the methods known from the literature and is within skills of a person skilled in the field. Thus for the preparation see e.g. EP-A-129368, WO-A-1998/056831, WO-A-2000/034341, EP-A-260130, WO-A-1997/028170, WO-A-1998/046616, WO-A-1998/049208, WO-A-1999/012981, WO-A-1999/019335, WO-A-1998/056831, WO-A-2000/034341, EP-A-423101 and EP-A-537130. WO2005/002744 describes a preferable catalyst and process for preparing said mLLDPE component.

Instead of a znLLDPE or mLLDPE a plastomer as defined above for the first film can be used.

LDPE means herein a low-density ethylene homopolymer produced in high-pressure polymerization process (autoclave or tubular).

Such LDPEs are well known in the art and they typically contain long chain branching which differentiates LDPEs from linear low-density polyethylenes, LLDPEs.

LDPE usable in the sealant layer of present invention is in principal not limited.

LDPE may typically have a MFR$_2$ (190° C., 2.16 kg; ISO 1133) of at least 0.05 g/10 min, preferably in the range 0.1-20 g/10 min, more preferably 0.3-10 g/10 min, still more preferably 0.4-5 g/10 min. In one embodiment, LDPE with MFR$_2$ of 0.2 to 1.0 g/10 min is preferred.

The density (ISO 1183) of the LDPE is typically 905-940 kg/m$^3$, preferably 910 to 935 kg/m$^3$, e.g. 915 to 930 kg/m$^3$.

The Tm (DSC, ISO 11357-3) of the LDPE is preferably 70-180° C., more preferably 90-140° C., e.g. about 110-120° C.

LDPEs suitable for the second film structure are any conventional LDPEs, e.g. commercially known LDPEs, or they may be prepared according to any conventional high-pressure polymerization (HP) process in a tubular or autoclave reactor using a free radical formation. Such HP processes are very well known in the field of polymer chemistry and described in the literature, see e.g. Vieweg, Schely and Schwarz: Kunstoff Handbuch, Band IV, Polyolefins, Carl Hanser Verlag (1969), pages 39-51. Typical pressures are from 1000 to 3000 bar. The polymerization temperature is preferably 150-350° C. The free radical initiators are commonly known, e.g. organic peroxide based initiators.

Suitable LDPE's are available commercially from Borealis, LyondellBasell, Exxon, Sabic, or other suppliers.

The amount of LDPE present in the sealant layer is 0 wt % up to 50% wt, preferably 0 to 45 wt %, more preferably 0 to 40 wt %.

Thus the amount of mLLDPE usable in the sealing layer typically varies between 50 to 100 wt %, preferably 55 to 100 wt % and more preferably between 60 to 100 wt % of the total amount of the sealant layer, i.e., the second polyethylene layer.

The amount of plastomer usable in the sealing layer typically varies from 30 to 70 wt %, preferably from 35 to 65 wt %, such as from 40 to 60 wt %, of the total amount of the sealant layer, i.e., the second polyethylene layer.

The second polyethylene layer in the extrusion laminated structure may be a monolayer film (only layer C).

The second polyethylene layer in the extrusion laminated structure may also be multi-layered. Multilayer films are preferably formed from at least two layers, ideally at least three layers, such as 3 layers, 5 layers or 7 layers.

For example one further layer (C-2) of the second polyethylene layer may be an LLDPE as described for layer A, preferably a multimodal, like bimodal LLDPE, more preferably a bimodal ethylene/1-butene/C6-C12-alpha-olefin terpolymer, with a density between 926 kg/m$^3$ to 950 kg/m$^3$.

In one embodiment the second polyethylene layer in the extrusion laminated structure comprises a second further film layer (C-3) forming a 3-layer film structure of C-3/C-2/C.

The second further film layer C-3 is preferably made of the same polymer as described above for the sealant layer C.

The layers C, C-2 and C-3 may all be of equal thickness or alternatively the layer C-2, forming the in this case the core layer, may be thicker than each of C-3 and C, forming outer layers.

A convenient 3-layer film comprises two outer layers (C-3 and C), which each forms 10 to 35%, preferably 15 to 30% of the total thickness of the 3-layered film, the core layer (i.e. C-2) forming the remaining thickness, e.g. 30 to 80%, preferably 40 to 70% of the total thickness of the 3-layered film.

In a further embodiment the second polyethylene layer in the extrusion laminated structure can comprise the sealant layer C, as described above, the at least one further layer C-2, as described above and additionally 3 further layers C-4, C-5 and C-6, forming a film of the structure C-6/C-5/C-4/C/C-2.

In this case C-2, C-4 and C-5 are composed of a LLDPE, which may be the same LLDPE in all three layers. These three layers may alternatively be composed of different LLDPEs or the middle layer of these three layers, in this case C-4, may be composed of one LLDPE and the two sandwiching layers, C-2 and C-5, may be composed of another LLDPE.

Suitable LLDPEs are described above for layer A of the film forming the first polyethylene layer.

Layer C-6 is composed of a blend of LLDPE and a metallocene produced linear low density polyethylene (mLLDPE).

Suitable LLDPEs are described above for layer A of the film forming the first polyethylene layer.

Suitable mLLDPEs are described above for the sealant layer C of the second polyethylene layer.

The amount of LLDPE in this layer is in the range of 40 to 80 wt %, preferably 50 to 70 wt % and more preferably 55 to 65 wt %, thus the mLLDPE being present in an amount of 20 to 60 wt %, preferably 30 to 50 wt % and more preferably 35 to 34 wt %.

The layers may all be of equal or different thickness. For example the sealant layer C and the layer C-6 may each contribute 5 to 15%, preferably 8 to 12 wt % of the total thickness and the layers C-5, C-4 and C-2 contribute the rest, whereby these three layers may be of equal thickness. The layers C-5, C-4 and C-2 can also have different thicknesses, like 10 to 25%/30 to 60%/10 to 25%, preferably 15 to 20%/40 to 50%/15 to 20%, wherein the total thickness of the film is 100%.

The second polyethylene layer may optionally contain a HDPE layer D in-between the above described multilayer structures or adhering to the sealant film C, being a monolayer film. The HDPE layer may act as barrier layer and/or as stiffening layer.

If used in the multilayer structure the HDPE barrier layer D can be in any position between two adjacent layers, like C-3/D/C-2/C or C-3/C-2/D/C or C-6/D/C-5/C-4/C/C-2, C-6/C-5/D/C-4/C/C-2, and so on.

Suitable HDPE barrier layers D consisting of HDPE polymer, may comprise one single HDPE polymer component or a mixture of said HDPE polymer component with one or more other HDPE polymer components. Mainly due to economic reasons embodiments wherein layer D consists of one HDPE polymer or a mixture of two different HDPE polymers is preferred. When layer D consists of a mixture of two HDPE polymers, same may be present in any desired weight ratio, typically these two HDPE polymers are then present in a weight ratio of from 30:70 to 70:30, more preferably from 60:40 to 40:60.

HDPE polymers to be employed in accordance with the present invention are polyethylenes having a density of at least 940 kg/m$^3$, preferably at least 945 kg/m$^3$, more preferably in the range of from 950 to 980 kg/m$^3$, such as from 950 to 965 kg/m$^3$. In particular, it is preferred when the density of the HDPE polymer to be employed in accordance with the present invention is at least 955 kg/m$^3$.

An HDPE polymer to be employed in accordance with the present invention designates a polyethylene which may be either a homopolymer or a copolymer comprising a minor amount of repeating units derived from one or more alpha-olefins having from 3 to 20 carbon atoms, preferably from 3 to 10 and more preferably from 3 to 6 carbon atoms. The comonomer content of a copolymer may typically be from 0.25 mol % to 10.0 mol %, more preferably 0.5 mol % to 5.0 mol %, and more preferably the upper limit for the comonomer content is 2.5 mol %. In accordance with the present invention both homopolymers and copolymers of polyethylene are equally preferred.

The HDPE polymer to be employed in accordance with the present invention may be unimodal with respect to properties such as molecular weight distribution and/or comonomer content or the HDPE polymer to be employed in accordance with the present invention may be multimodal, in particular bimodal, with respect to properties such as molecular weight distribution and/or comonomer content.

A preferred embodiment in accordance with the present invention is a multimodal HDPE polymer, comprising at least a lower molecular weight component (LMW) and a higher molecular weight component (HMW). These components may be present in any desired ratios, with typical split, i.e. weight ratios between the LMW component and the HMW component being from 10:90 to 90:10, preferably 40:60 to 60:40. The LMW and/or HMW component can be a homo- or copolymer, preferably at least one of the LMW and HMW components is a homopolymer. More preferably, the LMW component is a homopolymer and the HMW component is homo- or copolymer, typically a copolymer.

In accordance with preferred embodiments of the present invention, layer D either consists of a unimodal HDPE polymer (with respect to the molecular weight distribution) or of a multimodal, preferably bimodal HDPE polymer (with respect to the molecular weight distribution).

The melt flow rate (MFR) of the HDPE polymer to be employed for layer D in accordance with the present invention is not critical and can be varied depending on the mechanical properties desired for an end application. In one preferable embodiment MFR$_2$ value in the range of from 0.05 to 10 g/10 min, preferably 0.1 to 2 g/10 min and more preferably from 0.3 to 0.8 g/10 min are desired. In another preferable embodiment MFR$_{21}$ value in the range of from 2 to 12 g/10 min, preferably 4 to 10 g/10 min, more preferably 6 to 8 g/10 min are desired.

The HDPE polymer to be employed in accordance with the present invention may be a known and e.g. commercially available, polyethylene polymer or said HDPE polymer may be prepared using any coordination catalyst, typically ZN catalysts, Cr-catalyst as well as single site catalysts (SSC). The molecular weight distribution (MWD) expressed as Mw/Mn of the HDPE polymer to be employed in accordance with the present invention is not critical and can vary depending, again, on the mechanical properties desired for the end application. MWD is preferably in the range of from 2 to 35, wherein preferred ranges for, unimodal HDPE polymer are from 2 to 20, preferably 3 to 10, in particular 4 to 7 and more preferably 4.5 to 6.0, while preferred ranges for multimodal, preferably bimodal HDPE polymer are from 10 to 35, preferably 12 to 20, whereas in some embodiments, as broad as 15 to 35 may be desired.

HDPE polymer to be employed in accordance with the present invention may be produced using polymerization reactions which are, in principle, known in the art and available to the skilled person. They can further be produced in principle using any polymerization method, including solution, slurry and gas phase polymerization. The temperature in the polymerization reactor needs to be sufficiently high to reach an acceptable activity of the catalysts, while not exceeding the softening temperature of the polymer, in order to avoid processing problems. Typical polymerization temperatures may therefore be in the range of from 50 to 110° C., preferably 75 to 105° C. and more preferably 75 to 100° C. Reactor pressures can be selected over a broad range depending on the type of polymerization and, in principle, are known to the skilled person. Suitable pressure ranges for slurry polymerizations are, for example, 10 to 100 bar, preferably 30 to 80 bar.

Suitable films, HDPE resins for producing such films and their production are disclosed, among others in WO-A-1999/058584, WO-A-1999/051649, WO-A-2007/104513 and WO-A-2007/065644.

The film structure for the film forming the second polyethylene layer in extrusion laminated structure in accordance with the present invention may be prepared by any conventional film extrusion procedure known in the art, e.g. with cast film or blown film extrusion. Preferably, the film is formed by blown film extrusion, more preferably by co-extrusion processes, which in principle are known and available to the skilled person.

Typical processes for preparing a film structure in accordance with the present invention are extrusion processes through an annular die, followed by blowing into a tubular film by forming a bubble which is collapsed between the rollers after solidification. This film can then be slit, cut or converted, such as by using a gazette head, as desired. Conventional film production techniques may be used in this regard. Typically the layers are coextruded at a temperature in the range of from 160 to 240° C. and cooled by blowing gas (generally air) at a temperature of 5 to 50° C., to provide a frost line height of 1 or 2 to 8 times the diameter of the dye. The blow up ratio can be in the range of from 1 (1:1) to 4 (1:4), preferably 1.5 (1:1.5) to 3.5 (1:3.5), more preferably from 2 (1:2) to 3 (1:3).

If the second polyethylene layer is oriented in machine direction, the same procedure as described for the first polyethylene layer is applied.

Layer of Copolymer of Ethylene and Vinyl Alcohol

The structure comprises a layer comprising a copolymer of ethylene and vinyl alcohol. Preferably the layer essentially consists of the copolymer of ethylene and vinyl alcohol. By "essentially consists of" is meant that the layer may contain minor amount of additives known in the art, such as antioxidants, and other polymers as long as such other polymers do not adversely influence the oxygen barrier properties of the copolymer of ethylene and vinyl alcohol. Typically the layer then comprises at least 95% by weight, preferably at least 98% by weight and more preferably at least 99% by weight of the copolymer of ethylene and vinyl alcohol.

Suitably the copolymer of ethylene and vinyl alcohol has a content of ethylene units of from 20 to 45% by mole, preferably from 25 to 40% by mole and more preferably from 27 to 37% by mole. Furthermore, the copolymer of ethylene and vinyl alcohol suitably has a density of from 1000 to 1250 kg/m$^3$, preferably from 1050 to 1230 kg/m$^3$ and more preferably from 1100 to 1220 kg/m$^3$. It furthermore suitably has a melt flow rate MFR$_2$ (measured under a load of 2.16 kg at a temperature of 190° C.) of from 1 to 10 g/10 min, preferably from 2 to 8 g/10 min and more preferably from 2.5 to 7.5 g/10 min.

The layer of the copolymer of ethylene and vinyl alcohol suitably has a basis weight of from 1 to 10 g/m$^2$, preferably from 1 to 8 g/m$^2$ and more preferably from 2 to 6 g/m$^2$. A too low basis weight may lead to insufficient barrier properties. A too high basis weight leads to an unnecessary high cost of the structure and may also make the coating thicker than desired. Furthermore, the recyclability may suffer if the structure contains too much of the copolymer of ethylene and vinyl alcohol.

Tie Layer

The structure comprises tie layers on both sides of the layer comprising a copolymer of ethylene and vinyl alcohol. Their objective is to improve the adhesion between the layer comprising the copolymer of ethylene and vinyl alcohol and the polyethylene layers.

The polymers used in the tie layers are suitably ethylene-based polymers, such as copolymers of ethylene with a polar comonomer. Preferably the polymers in the tie layers are graft copolymers of ethylene with polar comonomers, such as organic acids and organic acid derivatives. The organic acids and their derivatives are suitably selected from the group of organic acids comprising a double bond and their derivatives, and preferably from the group consisting of acrylic acid, methacrylic acid, fumaric acid, maleic acid, nadic acid, citraconic acid, itaconic acid, crotonic acid, the anhydrides thereof, metal salts thereof, esters thereof, amides thereof, imides thereof, and the mixtures of two or more above-mentioned compounds.

When the polymers used in the tie layers are graft copolymers of ethylene, then the base polymer used in the grafting process may be any suitable ethylene polymer, such as high density polyethylene, medium density polyethylene, linear low density polyethylene, ethylene-based plastomer, ethylene-based elastomer, low density polyethylene or a mixture of two or more above-mentioned polymers.

When the polymers used in the tie layers are graft copolymers of ethylene they can be produced according to the methods known in the art. For instance, the polymers can be produced by grafting in an extruder by feeding the base polymer, the graft comonomer and a free radical generator, such as a peroxide, into the extruder and extruding the mixture at a temperature which exceeds the melting temperature of the base polymer and the decomposition temperature of the free radical generator. On the other hand, the temperature must be less than the decomposition temperature of the base polymer.

The polymers used in the tie layers suitably have an MFR$_2$ of from 0.5 to 10 g/10 min, preferably from 1 to 10 g/10 min and more preferably from 2 to 10 g/10 min. Further, the polymers used in the tie layers suitably have a density of from 905 to 940 kg/m$^3$, preferably from 910 to 940 kg/m$^3$ and more preferably from 915 to 940 kg/m$^3$.

Polymers suitable to be used in the tie layers are commercially available, for instance, from DuPont under trade name of Bynel®. Especially the polymers having a higher amount of incorporated anhydride are preferred, and, for instance, of Bynel® 41E710 has given good results.

Each of the tie layers has a basis weight of from 1 to 10 g/m$^2$, preferably from 2 to 8 g/m$^2$ and more preferably from 2 to 6 g/m$^2$. A too low basis weight may lead to insufficient adhesion. A too high basis weight has no major technical drawback but leads to an unnecessary high cost of the structure and may also make the coating thicker than desired.

It should be understood that the structure may comprise additional layers to the first polyethylene layer, the second polyethylene layer, the layer of the copolymer of ethylene and vinyl alcohol and the tie layers. If any such additional layer has a good adhesion to the layer of the copolymer of ethylene and vinyl alcohol then such a layer may be adjacent to the layer of the copolymer of ethylene and vinyl alcohol and the tie layer is adjacent to such additional layer. However, when such layer having a good adhesion to the layer of the copolymer of ethylene is absent then the tie layer should be adjacent to the layer of the copolymer of ethylene and vinyl alcohol.

Production Process
Extrusion Coating

According to one preferred embodiment the structure is produced by extrusion coating. In such a process the layer of the copolymer of ethylene and vinyl alcohol, the tie layers and the second polyethylene layer are extrusion coated onto a substrate formed by the first polyethylene layer. The layer of the copolymer of ethylene and vinyl alcohol, the tie layers and the second polyethylene layer are extruded onto the substrate through a flat die, or more precisely, an arrangement of multiple flat dies. The extrusion coating process, including coextrusion, is well known to the person skilled in the art.

As it is well known in the art, it is possible to improve the adhesion between the layers by subjecting the substrate to flame treatment or corona treatment. Furthermore, the melt can be subjected to ozone treatment for improving the adhesion.

When the layer of the copolymer of ethylene and vinyl alcohol, the tie layers and the second polyethylene layer have been extruded onto the substrate the structure is passed to a nip formed by a chill roll and a pressure roll. The chill roll is typically water-cooled and has the objective of cooling the extruded structure to a suitable temperature. Typically the surface temperature of the chill roll can be from about 15° C. to about 60° C.

According to one preferred embodiment of the invention the second polyethylene layer comprises, and preferably essentially consists of, low density polyethylene. The layer is extruded typically so that the temperature of the melt is from about 275° C. to about 330° C. By "essentially consists of" is meant that the second polyethylene layer may contain minor amount of additives known in the art, such as antioxidants, and other polymers as long as such other polymers do not adversely influence the processability of the low density polyethylene. Typically the amount of additives and other polymers is then not more than 2% by weight, preferably not more than 1% by weight and especially preferably not more than 0.5% by weight. In any case, when the structure is produced by extrusion coating the second polyethylene layer typically comprises at least 40% by weight, preferably at least 50% by weight, more preferably at least 75% by weight and especially preferably at least 90% by weight of low density polyethylene. The percentage numbers above are based on the total weight of the second polyethylene layer.

The low density polyethylene typically has a melt flow rate $MFR_2$ (measured under a load of 2.16 kg at a temperature of 190° C.) of from 1 to 15 g/10 min, preferably from 2 to 10 g/10 min and even more preferably from 3 to 8 g/10 min. It further typically has a density of from 915 to 930 kg/m$^3$, preferably from 916 to 926 kg/m$^3$ and even more preferably from 917 to 925 kg/m$^3$. The low density polyethylene can be produced in an autoclave process as disclosed in EP-A-1777238 or in a tubular process as disclosed in WO-A-2013/132009, WO-A-2013/083285, WO-A-2013178241 and WO-A-2013/178242. Preferably the low density polyethylene is produced in a tubular process.

The layer of the low density polyethylene typically has a basis weight of from 5 to 50 g/m$^2$, preferably from 5 to 30 g/m$^2$, such as from 5 to 20 g/m$^2$.

According to another preferred embodiment of the invention the second polyethylene layer comprises heat sealable ethylene copolymer, such as linear low density polyethylene or ethylene-based plastomer or ethylene-based elastomer. The layer may in addition comprise low density polyethylene for improving the processability. Alternatively or additionally the layer may be coextruded with a layer of low density polyethylene to ensure a good behaviour in the extrusion coating line. In this embodiment the second polyethylene layer typically comprises at least 20% by weight, preferably at least 25% by weight and more preferably at least 30% by weight of the heat sealable ethylene copolymer. The upper limit is not critical and may be about 100% by weight, such as 95% by weight of 90% by weight. The percentage numbers above are based on the total weight of the second polyethylene layer. The layer is extruded typically so that the temperature of the melt is from about 275° C. to about 330° C.

Preferably the heat sealable ethylene copolymer is a linear low density polyethylene (LLDPE), produced either with a Ziegler-Natta catalyst (znLLDPE) or produced with a metallocene catalyst (mLLDPE) or an ethylene-based plastomer.

The $MFR_2$ (190° C., 2.16 kg, ISO 1133) of suitable znLLDPE's is in the range 0.01 to 20 g/10 min, preferably in the range of 0.05 to 10 g/10 min, more preferably in the range of 0.1 to 6.0 g/10 min and even more preferably in the range of 0.1 to 5.0 g/10 min.

The znLLDPE may have a density in the range of 910 to 950 kg/m$^3$, preferably 915 to 945 kg/m$^3$ preferably such as 920 to 940 kg/m$^3$.

The Mw/Mn of the znLLDPE can be in a quite broad range. Preferred Mw/Mn values are 3 or more, such as 6 or more, even 10 or more. Ranges of 3.5 to 30 are envisaged.

The znLLDPE contains at least one or two comonomer(s). Suitable comonomers are C3-C10 alpha-olefin comonomers. Thus the znLLDPE can be a copolymer of ethylene and one C3-C10 alpha-olefin comonomer or a terpolymer of ethylene and two different C3-C10 alpha-olefin comonomers. Preferably the comonomers are selected from the group of 1-butene, 1-hexene and 1-octene. It is preferred if the comonomer employed is 1-butene and/or 1-hexene. Preferred terpolymers comprise 1-butene and 1-hexene comonomers.

The overall comonomer content in the total polymer is 0.3 to 7.0% by mol, preferably 0.6 to 4.5% by mol, more preferably 1.0 to 3.5% by mol and most preferably 1.2 to 2.3% by mol.

If the znLLDPE is a terpolymer of ethylene and two different C3-C10 alpha-olefin comonomers, preferably 1-butene and 1-hexene, 1-butene is present in an amount of 0.1 to 3.0% by mol, preferably 0.2 to 2.0% by mol, more preferably 0.3 to 1.5% by mol and most preferably 0.4 to 0.8% by mol and hexene is present in an amount of 0.2 to 4.0% by mol, preferably 0.4 to 2.5% by mol, more preferably 0.7 to 2.0% by mol and most preferably 0.8 to 1.5% by mol.

The znLLDPE can be unimodal or multimodal, preferably multimodal. A unimodal znLLDPE possesses a single peak in its GPC spectrum as it is made in a single stage process. It is most preferred if the znLLDPE is a multimodal znLLDPE formed from a homopolymer component and a copolymer component. These polymers are well known in the art and are available from Borealis and others, e.g. under the Borstar type trade name.

Preferably such multimodal, like bimodal znLLDPEs are produced in a multi-stage polymerization using the same catalyst. Thus, two slurry reactors or two gas phase reactors could be employed. Preferably however, such multimodal, like bimodal znLLDPEs are made using a slurry polymerization in a loop reactor followed by a gas phase polymerization in a gas phase reactor.

As used herein, the mLLDPE polymer is an ethylene copolymer having a density of 940 kg/m³ or less. Preferred mLLDPE's may have a density of 905 to 940 kg/m³, more preferably 910 to 937 kg/m³. In one preferable embodiment even densities of 915 to 925 kg/m³ are highly feasible.

The mLLDPE is formed from ethylene along with at least one C3-C20-alpha-olefin comonomer, preferably C3-C12-alpha-olefin comonomer, e.g. 1-butene, 1-hexene or 1-octene. Preferably, the mLLDPE is a binary copolymer, i.e. the polymer contains ethylene and one comonomer, or a terpolymer, i.e. the polymer contains ethylene and two or three, preferably two, comonomers. Preferably, the mLLDPE comprises an ethylene-hexene copolymer, ethylene-octene copolymer, ethylene-butene copolymer or a terpolymer of ethylene with 1-butene and 1-hexene comonomers. The amount of comonomer present in the mLLDPE is preferably 0.5 to 12 mol %, more preferably 2 to 10 mol %, and most preferably 4 to 8 mol %. Alternatively, comonomer contents present in the mLLDPE may be 1.5 to 10 wt %, especially 2 to 8 wt %.

The $MFR_2$ of mLLDPE's is preferably in the 0.01 to 20 g/10 min, more preferably 0.2 to 10 g/10 min, even more preferably 0.3 to 6.0 g/10 min, and most preferably 0.4 to 5.0 g/10 min.

The mLLDPE may be unimodal or multimodal, both are preferable. By unimodal is meant that the molecular weight profile of the polymer preferably comprises a single peak and mLLDPE is preferably produced by copolymerising ethylene in one reactor in the presence of one metallocene catalyst.

The unimodal mLLDPE polymers preferably possess a narrow molecular weight distribution. The Mw/Mn value is preferably 2 to 4, more preferably 2 to 3.

Multimodal can be understood as bimodal molecular weight distribution or bimodal comonomer distribution (e.g. the MFR's of the components are the same, but they contain same comonomer in different amounts). Bimodal mLLDPE comprise a LMW component and a HMW component.

Both the LMW and HMW components of multimodal mLLDPE are preferably copolymers of ethylene as defined above.

The molecular weight distribution, Mw/Mn, of a multimodal mLLDPE may be below 30, preferably in the range of 2-5.

Suitable mLLDPE's are available commercially from ExxonMobil Chemical, Nova, Dow, Basell, to mention a few.

Alternatively, suitable mLLDPE polymers can be produced in a known manner according to or analogously to conventional polymerization processes, including solution, slurry and gas phase processes, described in the literature of polymer chemistry.

Unimodal mLLDPE, as defined above is preferably prepared using a single stage polymerization, e.g. solution, slurry or gas phase polymerization, preferably a slurry polymerization in slurry tank or, more preferably, in loop reactor in a manner well known in the art. As an example, said unimodal mLLDPE can be produced e.g. in a single stage loop polymerization process according to the principles given below for the polymerization of low molecular weight fraction in a loop reactor of a multistage process, naturally with the exception that the process conditions (e.g. hydrogen and comonomer feed) are adjusted to provide the properties of the final unimodal polymer.

Multimodal (e.g. bimodal) mLLDPE as defined above can be made by blending mechanically two or more separately prepared polymer components, or preferably, by in situ blending in a multistage polymerization process during the preparation process of the polymer components. Both mechanical and in situ blending is well known in the field.

Accordingly, preferred multimodal mLLDPE polymers are obtainable by in-situ blending in a multistage, i.e. two or more stage, polymerization process including solution, slurry and gas phase process, in any order. Alternatively said multimodal mLLDPE may be obtainable by using two or more different polymerization catalysts, including multi- or dual site catalysts, in a one-stage polymerization.

Preferably the multimodal mLLDPE as defined above is produced in at least two-stage polymerization using the same catalyst, e.g. a single site catalyst. Thus, for example two slurry reactors or two gas phase reactors, or any combinations thereof, in any order can be employed.

mLLDPE as defined above may be made using any conventional single site catalysts (SSC), which SSC catalysts include metallocenes.

All these catalysts are well known in the field. In case of mLLDPE, metallocene catalysis is preferably used herein. The preparation of the metallocene catalyst can be carried out according or analogously to the methods known from the literature and is within skills of a person skilled in the field. Thus for the preparation see e.g. EP-A-129 368, WO-A-9856831, WO-A-0034341, EP-A-260 130, WO-A-9728170, WO-A-9846616, WO-A-9849208, WO-A-9912981, WO-A-9919335, WO-A-9856831, WO-A-00/34341, EP-A-423101 and EP-A-537130. WO2005/002744 describes a preferable catalyst and process for preparing said mLLDPE component.

Suitable ethylene-based plastomers or ethylene-based elastomers are copolymers of ethylene with other alpha-olefins which copolymers have a density of not more than 915 kg/m³. The ethylene-based plastomer is a copolymer of ethylene and propylene or a C4-C10 alpha-olefin. Suitable C4-C10 alpha-olefin include 1-butene, 1-hexene and 1-octene, preferably 1-butene or 1-octene and more preferably 1-octene. Preferably copolymers of ethylene and 1-octene are used.

Preferred ethylene-based plastomers have a density in the range of 860 to 915 kg/m³, more preferably in the range of 870 to 910 kg/m³.

The $MFR_2$ (ISO 1133; 190° C.; 2.16 kg) of suitable ethylene based plastomers is in the range of 2.0-30 g/10 min, preferably in the range of 3.0-20 g/10 min and more preferably in the range of 5.0-15.0 g/min.

The melting points (measured with DSC according to ISO 11357-3:1999) of suitable ethylene based plastomers are below 130° C., preferably below 120° C., more preferably below 110° C. and most preferably below 100° C. Furthermore suitable ethylene based plastomers have a glass transition temperature Tg (measured with DMTA according to ISO 6721-7) of below −25° C., preferably below −30° C., more preferably below −35° C.

In case the copolymer is a copolymer of ethylene and propylene it has an ethylene content from 10 to 55 wt %, preferably from 15 to 50 wt % and more preferably from 18 to 48 wt %. In case the copolymer is a copolymer of ethylene and a C4-C10 alpha olefin it has an ethylene content from 60 to 95 wt %, preferably from 65 to 90 wt % and more preferably from 70 to 88 wt %.

The molecular mass distribution Mw/Mn of suitable ethylene based plastomers is most often below 4, such as 3.8 or below, but is at least 1.7. It is preferably between 1.8 and 3.5.

Suitable ethylene based plastomers can be any copolymer of ethylene and propylene or ethylene and C4-C10 alpha olefin having the above defined properties, which are commercial available, i.a. from Borealis under the tradename Queo, from Dow Chemical Corp (USA) under the tradename Engage or Affinity, or from Mitsui under the tradename Tafmer.

Alternately these ethylene based plastomers can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene based plastomers are prepared by a one stage or two stage solution polymerization process, especially by high temperature solution polymerization process at temperatures higher than 100° C. Such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110°, more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a C5-12-hydrocarbon which may be unsubstituted or substituted by C1-4 alkyl group such as pentane, methyl pentane, hexane, heptane, octane, cyclohexane, methylcyclohexane and hydrogenated naphtha. More preferably unsubstituted C6-10-hydrocarbon solvents are used. Such processes are disclosed, among others, in WO-A-1997/036942, WO-A-2006/083515, WO-A-2008/082511, and WO-A-2009/080710.

The copolymer of ethylene and vinyl alcohol degrades at high temperature and therefore the extrusion temperature for the copolymer of ethylene and vinyl alcohol should be substantially lower than the extrusion temperature for the second polyethylene layer. A suitable extrusion temperature is within the range of from about 200° C. to about 240° C., preferably from 210 to 240° C. and advantageously about 230° C. As it is well known in the art, the extrusion of the copolymer of ethylene and vinyl alcohol should be conducted within a very narrow temperature range to avoid degradation.

The layer of the copolymer of ethylene and vinyl alcohol suitably has a basis weight of from 1 to 10 $g/m^2$, preferably from 1 to 8 $g/m^2$ and more preferably from 2 to 6 $g/m^2$. A too low basis weight may lead to insufficient barrier properties. A too high basis weight has no major technical drawback but leads to an unnecessary high cost of the structure and may also make the coating thicker than desired.

The polymers used in the tie layers are also preferably extruded at a lower temperature than the polyethylene. A suitable extrusion temperature is within the range of from about 200° C. to about 280° C., preferably from 220° C. to 260° C.

Each of the tie layers typically has a basis weight of from 1 to 10 $g/m^2$, preferably from 1 to 8 $g/m^2$ and more preferably from 2 to 6 $g/m^2$. A too low basis weight may lead to insufficient adhesion. A too high basis weight has no major technical drawback but leads to an unnecessary high cost of the structure and may also make the coating thicker than desired.

It is also possible to extrude additional layers to onto the first polyethylene layer if desired. The extrusion conditions for such additional layers are determined by the type of polymers included in such additional layers. For instance, if the second polyethylene layer is a linear polymer, such as linear low density polyethylene, then it is often advantageous to coextrude a layer of low density polyethylene with the second polyethylene layer to ensure smooth processability. Such additional polyethylene layers typically have a basis weight of from 1 to 50 $g/m^2$, preferably from 2 to 30 $g/m^2$, such as from 2 to 20 $g/m^2$.

The line speed in the extrusion coating process is typically from 50 to 1000 m/min, preferably from 100 to 650 m/min, and especially from 150 to 500 m/min.

Extrusion Lamination

According to another preferred embodiment the structure is produced by extrusion lamination. The extrusion lamination process resembles the extrusion coating process, but in extrusion lamination the layers are extruded between two substrates. Thereby, the first polyethylene layer and the second polyethylene layer are provided as substrates to the extrusion lamination process. The layer of the copolymer of ethylene and vinyl alcohol and the tie layers are then extruded between the first polyethylene layer and the second polyethylene layer. If so desired additional layers can also be extruded between the first polyethylene layer and the second polyethylene layer. Such additional layers may, depending on the need, be further polymers, such as additional polyethylene layers.

The line speed in the extrusion lamination process is typically from 50 to 1000 m/min, preferably from 100 to 650 m/min, and especially from 150 to 500 m/min.

When the structure is produced by extrusion lamination then the second polyethylene layer is suitably a film made of polyethylene as has been discussed above.

When the layer of the copolymer of ethylene and vinyl alcohol and the tie layers have been extruded between the two films the structure is passed to a nip formed by a chill roll and a pressure roll. The chill roll is typically water-cooled and has the objective of cooling the extruded structure to a suitable temperature. Typically the surface temperature of the chill roll can be from about 15° C. to about 60° C.

The copolymer of ethylene and vinyl alcohol degrades at high temperature and therefore the extrusion temperature for the copolymer of ethylene and vinyl alcohol should be substantially lower than the extrusion temperature for the second polyethylene layer. A suitable extrusion temperature is within the range of from about 200° C. to about 240° C., preferably from 210 to 240° C. and advantageously about 230° C.

The layer of the copolymer of ethylene and vinyl alcohol suitably has a basis weight of from 1 to 10 $g/m^2$, preferably from 1 to 8 $g/m^2$ and more preferably from 2 to 6 $g/m^2$. A too low basis weight may lead to insufficient barrier properties. A too high basis weight has no major technical drawback but leads to an unnecessary high cost of the structure and may also make the coating thicker than desired.

The polymers used in the tie layers are also preferably extruded at a lower temperature than the polyethylene. A suitable extrusion temperature is within the range of from about 200° C. to about 280° C., preferably from 220° C. to 260° C.

Each of the tie layers typically has a basis weight of from 1 to 10 g/m², preferably from 1 to 8 g/m² and more preferably from 2 to 6 g/m². A too low basis weight may lead to insufficient adhesion. A too high basis weight has no major technical drawback but leads to an unnecessary high cost of the structure and may also make the coating thicker than desired.

As described above additional layers can also be extruded between the first polyethylene layer and the second polyethylene layer. Thus, according to an especially preferred embodiment layers of low density polyethylene are extruded between the tie layers and the polyethylene films. Such polyethylene layers typically have a basis weight of from 1 to 50 g/m², preferably from 2 to 30 g/m², such as from 2 to 20 g/m².

Such additional layers thus comprise, and preferably essentially consist of, low density polyethylene. By "essentially consists of" is meant that the additional polyethylene layer may contain minor amount of additives known in the art, such as antioxidants, and other polymers as long as such other polymers do not adversely influence the processability of the low density polyethylene. Typically the amount of additives and other polymers is then not more than 2% by weight, preferably not more than 1% by weight and especially preferably not more than 0.5% by weight. In any case, such additional layer typically comprises at least 40%, preferably at least 50%, more preferably at least 75% and especially preferably at least 90% of low density polyethylene.

The low density polyethylene typically has a melt flow rate $MFR_2$ (measured under a load of 2.16 kg at a temperature of 190° C.) of from 1 to 15 g/10 min, preferably from 2 to 10 g/10 min and even more preferably from 3 to 8 g/10 min. It further typically has a density of from 915 to 930 kg/m³, preferably from 916 to 926 kg/m³ and even more preferably from 917 to 925 kg/m³. The low density polyethylene can be produced in an autoclave process as discussed above. It can also be a blend of two low density polyethylenes, one of which is produced in an autoclave process and one in a tubular process. Preferably, the low density polyethylene is produced in a tubular process.

Benefits of the Invention

The structures according to the present invention are recyclable and thus comprise copolymers of ethylene. Especially, all the polymers comprised in the present structures are ethylene-based homo- or copolymers.

Compared to prior art processes and structures the present invention offers a number of advantages. The process has one less treatment step compared to standard lamination process. Further, the present structures provide a more resilient solution compared to barrier film (PE/EVOH) structures. Especially, barrier film structures cannot easily be oriented because the layer containing the copolymer of ethylene and vinyl alcohol may not withstand orientation. The present invention provides a solution, where orientation of the barrier layer can be avoided. The invention provides a simpler solution as the prior art films with barrier layer having a complex structure, films having at least five layers produced by co-extrusion. Furthermore, if the films need to have a specific colour, such as white colour, this would cause additional complexity in prior art films if the structure contains the copolymer of ethylene and vinyl alcohol.

The process of the present invention is flexible and avoids many of the problems encountered in the prior art processes. For instance, the structure is cooled rapidly and effectively. Thereby the widely different crystallisation rates of the copolymer of ethylene and vinyl alcohol and polyethylene do not cause problems, as the case may be, for instance, in air-cooled blown film process.

The adhesives used in adhesive lamination are typically not ethylene-based polymers and this causes problems in recycling. Furthermore, adhesive lamination process needs an additional curing time for adhesion. Further still, such adhesives may leave decomposition products in the film, which decomposition products may be harmful for health or environment.

The inventors have further found that it is possible to control the curling of the material. When coating stiff substrates, such as paper, paperboard or oriented polyesters (such as OPET), the structure tends to curl to the direction of the coating. The present extrusion coating process, where the substrate is a machine direction oriented polyolefin-based film, such as polyethylene film, allows influencing the curling tendency by adjusting the web tension. It has also been found that the films with multilayer structure of the invention and films produced according to the process of the invention allow broadening of the sealing temperature window, even up to 40 C°.

Description of Methods

Tensile modulus in machine direction was measured at room temperature according to ISO 527-3.

Gloss (at 20°) was measured according to ASTM D2457.

Haze was measured according to ASTM D1003.

EXAMPLES

The following materials were used in the following experimental tests:

PE1: PE1 was a bimodal Ziegler Natta produced terpolymer (C2/C4/C6) Grade BorShape™ Borshape FX1001 provided by Borealis AG. It had $MFR_5$ of 0.85 g/10 min and a density of 931 kg/m³.

PE2: PE2 was a high density polyethylene Hostalen 7740 F2 provided by LyondellBasell. It had $MFR_5$ of 1.8 g/10 min and a density of 948 kg/m³.

PE3: PE3 was an ethylene based octene plastomer Queo™ 8201 provided by Borealis AG. It had MFR (190/2.16) of 1.1 g/10 min, unimodal molecular weight distribution and a density 882 kg/m³. It was produced in a solution polymerization process using a metallocene catalyst. It contained processing stabilizers.

PE4: PE4 was a low density polyethylene CT7200 provided by Borealis AG. It had $MFR_2$ (190/2.16) of 5 g/10 min and a density of 918 kg/m³. It had been produced in a high-pressure tubular process.

PE5: PE5 was a low density polyethylene FT5230 provided by Borealis AG. It had $MFR_2$ (190/2.16) of 0.7 g/10 min and a density of 923 kg/m³. It had been produced in a high-pressure tubular process.

PE6: PE6 was a linear low density polyethylene Exceed 1018CA provided by ExxonMobil. It had $MFR_2$ (190/2.16) of 1 g/10 min and a density of 918 kg/m³. It was a metallocene-based LLDPE.

PE7: PE7 was a high density polyethylene FB1520 provided by Borouge Pte Ltd. It had $MFR_{21}$ (190/21.6) of 7 g/10 min and a density of 952 kg/m³. It had multimodal molecular weight distribution.

PE8: PE8 was a medium density polyethylene Borshape FX1002 provided by Borealis AG. It had MFR$_5$ (190/5) of 2 g/10 min and a density of 937 kg/m$^3$.

PE9: PE9 was a high density polyethylene FB1460 provided by Borouge Pte Ltd. It had MFR$_{21}$ (190/21.6) of 6 g/10 min and a density of 946 kg/m$^3$. It had multimodal molecular weight distribution.

A1: A1 was a processing agent Polybatch® AMF 705 HF provided by A. Schulman

A2: A2 was Polybatch® CE-505-E, which is a 5% erucamide slip concentrate based in polyethylene provided by A. Schulman.

A3: A3 was an anti-blocking and slip agent masterbatch Polybatch® AB 35 VT provided by A. Schulman.

A4: A4 was Schulman Polywhite NG8600 colour masterbatch containing 60% by weight of titanium dioxide.

EVOH: EVOH was a copolymer of ethylene and vinyl alcohol, EVAL™104B, supplied by Kuraray. It had MFR$_2$ (190/2.16) of 4.4 g/10 min and a density of 1.18 kg/m$^3$.

ADP: ADP was an adhesion polymer Bynel® 41E710, supplied by DuPont™. It is an anhydride-modified linear low-density polyethylene with a high level of anhydride modification. It had MFR$_2$ of 2.7 g/10 min and density of 922 kg/m$^3$.

Film 1

First film (used as substrate) of IE1, IE2, IE3 was coextruded on a 5-layer Alpine co-extrusion line with die diameter 400 mm, at a blow up ratio (BUR) of 1:2.7, frost line height 3D and Die gap 1.5 mm.

The formed film had a thickness of 110 µm (blocked film).

The composition of the 5 layers can be seen in Table 1:

TABLE 1

Structure of Film 1

| | | Layer* | | | | |
|---|---|---|---|---|---|---|
| | | a | b | c | d | e |
| PE1 | wt % | — | 98.5 | 98.5 | 98.5 | 80.0 |
| PE2 | wt % | 96.5 | — | — | — | — |
| PE3 | wt % | — | — | — | — | 20 |
| A1 | wt % | 0.5 | — | — | — | — |
| A2 | wt % | 1.5 | 1.5 | 1.5 | 1.5 | — |
| A3 | wt % | 1.5 | — | — | — | — |

Layers "a" to "e" are extruded via extruders a, b, c, d, and e of the 5-layer co-extrusion line.

Stretching was carried out using a mono-directional stretching machine manufactured by Hosokawa Alpine AG in Augsburg/Germany. The unit consists of preheating, drawing, annealing, and cooling sections, with each set at specific temperatures to optimize the performance of the unit and produce films with the desired properties. The heating was at 105° C., the stretching was done at 115° C., annealing and cooling was done at 110° down to 40° C.

The film obtained from blown film extrusion was pulled into the orientation machine then stretched between two sets of nip rollers where the second pair runs at higher speed than the first pair resulting in the desired draw ratio. Stretching is carried out with the respective draw ratios to reach the desired thickness. (Draw ratios and final thickness of MDO films are given in Table 2). After exiting the stretching machine the film is fed into a conventional film winder where the film is slit to its desired width and wound to form reels.

The properties of the MDO film are also given in Table 2:

TABLE 2

| Film 1 oriented in machine direction | | | |
|---|---|---|---|
| Primary film thickness [µm] | 110 | | |
| Draw ratio | 4.5 | | |
| Final film thickness [µm] | 25 | | |
| Parameter | | unit | |
| Tensile test MD/TD | Tensile modulus | MPa | 860/1110 |
| Optics | Gloss (20°) | % | 136 |
| | Haze | % | 4 |

Film 2

Film 2 was coextruded to a seven-layer structure according to Table 3 below. The total film thickness was 60 µm.

TABLE 3

Structure of Film 2

| | | Layer* | | | | | | |
|---|---|---|---|---|---|---|---|---|
| | | a | b | c | d | e | f | g |
| % of total thickness | | 10 | 20 | 12.5 | 15 | 12.5 | 20 | 10 |
| PE5 | wt % | 10 | | | | | | 10 |
| PE6 | wt % | 88 | | | | | | 88 |
| PE7 | wt % | | | | | | | |
| PE8 | wt % | | | 95 | 95 | 95 | | |
| PE9 | wt % | | 95 | | | | 95 | |
| A1 | wt % | 1 | | | | | | 1 |
| A2 | wt % | | 1 | 1 | 1 | 1 | 1 | |
| A3 | wt % | 1 | | | | | | 1 |
| A4 | wt % | | 4 | 4 | 4 | 4 | 4 | |

Layers "a" to "g" are extruded via extruders a, b, c, d, e, f and g of the 7-layer co-extrusion line.

Example 1 (IE1)

Extrusion coating run was made on Beloit coextrusion coating line. It had Peter Cloeren's EBR die and a five layer feed block. The width of the line die opening was 850-1000 mm, maximum width of the substrate is 800 mm and the line speed was maintained at 100 m/min.

The temperatures were such that EVOH and ADP were extruded at temperatures of 230° C. and 260° C., respectively, and PE4 at a temperature of 280° C.

The structure was cooled on a chill roll (incoming cooling water temperature was 15° C.) and then rewound.

In the coating line above Film 1 was used as a substrate and coated with a layer structure of ADP (adjacent to the substrate), EVOH, ADP and PE4 (external layer). Each layer of ADP had a basis weight of 3 g/m$^2$, the EVOH layer had a basis weight of 4 g/m$^2$ and the layer of PE4 had a basis weight of 10 g/m$^2$.

A sample was taken from the material and it was found that the curling occurred to the direction of the substrate while typically curling occurs to the direction of the coating. It was further found that by adjusting the web tension it was possible to influence the tendency of the material to curl. Increasing the web tension typically reduces the curling tendency to the direction of the coating.

Example 2 (IE2)

Extrusion lamination run was made on Beloit coextrusion coating line. It had Peter Cloeren's EBR die and a five layer feed block. The width of the line die opening was 850-1000 mm, maximum width of the substrate is 800 mm and the line speed was maintained at 100 m/min.

The temperatures were such that EVOH and ADP were extruded at temperatures of 230° C. and 270° C., respectively, and PE4 at a temperature of 300° C.

The structure was cooled on a chill roll (incoming cooling water temperature was 15° C.) and then rewound.

In the coating line above Films 1 and 2 were used as substrates. The layers of PE4, ADP, EVOH, ADP and PE4 were extruded between the films. Each layer of ADP had a basis weight of 5 g/m², the EVOH layer had a basis weight of 4 g/m² and each layer of PE4 had a basis weight of 5.5 g/m².

Example 3 (IE3)

The oxygen and water vapour permeability was measured from the structures of Examples 1 and 2 by using Mocon Permatran-W MG equipment at 38° C. A sample of the structure was placed in a test area of 50 cm². The relative humidity at one side of the structure was 90% and 0% at the other side. The oxygen transmission rate (OTR) and the water vapour transmission rates (WVTR) were measured from multiple samples during periods of from 18 to 98 hours. The transmission rates are shown in Table 4 expressed as g/(m²·day). The values shown in the table are averages of multiple measurements. The standard deviations are shown in the parentheses. The values show that the structures have very good barrier properties.

TABLE 4

OTR and WVTR measured from the structures of Examples 1 and 2

| Structure of Example | OTR, g/(m² · day) | WVTR, g/(m² · day) |
|---|---|---|
| 1 | 0.80 (0.03) | 3.80 (0.21) |
| 2 | 1.21 (0.01) | 2.13 (0.07) |

The invention claimed is:

1. A multilayer structure comprising:
   (i) a first polyethylene layer as a first external layer, said first polyethylene layer being oriented in at least machine direction;
   (ii) a second polyethylene layer as a second external layer;
   (iii) a layer made of a copolymer of ethylene and vinyl alcohol (EVOH) between the first external layer and the second external layer; and
   (iv) a tie layer on each side of the EVOH layer, characterised in that the tie layers comprise one or more copolymers of ethylene,
   wherein the first polyethylene layer (i) is a multi-layer film,
   wherein the first polyethylene layer (i) is oriented only in a machine direction and the second polyethylene layer (ii) is unoriented.

2. The multilayer structure according to claim 1, wherein the tie layers comprise modified ethylene homo- or copolymers comprising ethylene units and units selected from the group consisting of organic acids, organic acid derivatives and mixtures thereof.

3. The multilayer structure according to claim 2, wherein the organic acid and organic acid derivative is selected from the group consisting of acrylic acid, methacrylic acid, fumaric acid, maleic acid, nadic acid, citraconic acid, itaconic acid, crotonic acid, the anhydrides thereof, metal salts thereof, esters thereof, amides thereof, imides thereof, and the mixtures thereof.

4. The multilayer structure according to claim 1, wherein the structure comprises from 95 to 100% by weight of the structure of homopolymers of ethylene, copolymers of ethylene and mixtures thereof.

5. The multilayer structure according to claim 4, wherein the structure comprises from 98 to 100% by weight of the structure of homopolymers of ethylene, copolymers of ethylene and mixtures thereof.

6. The multilayer structure according to claim 1, wherein the first polyethylene layer (i) is formed from at least three layers.

7. A process for producing a multilayer structure according to claim 1, said process comprising the steps of: (I) providing a substrate, wherein the substrate is a polyethylene film which has been oriented in at least machine direction; (II) coextruding onto the substrate (II-1) a layer of a copolymer of ethylene and vinyl alcohol; (II-2) a second polyethylene layer; and (II-3) tie layers on both sides of the layer of the copolymer of ethylene and vinyl alcohol, wherein the layer of the copolymer of ethylene and vinyl alcohol is between the substrate and the second polyethylene layer, thereby producing the multilayer structure, wherein the substrate is a multilayer polyethylene film which has been oriented in at least machine direction.

8. The process according to claim 7, further comprising the step of extruding the layer of the copolymer of ethylene and vinyl alcohol at a temperature within the range of from 200° C. to 240° C.

9. The process according to claim 7, further comprising the step of extruding the tie layers at a temperature within the range of about 200° C. to about 280° C.

10. The process according to any one of claim 7, further comprising the step of extruding the layer of polyethylene at a temperature within the range of from 275° C. to 330° C.

11. The process according to claim 7, wherein the substrate is a multilayer polyethylene film which is formed from at least three layers.

12. A process for producing a multilayer structure according to claim 1, said process comprising the steps of: (a) providing a first polyethylene film which first polyethylene film has been oriented in at least machine direction; (b) providing a second polyethylene film; (c) coextruding (c-1) a layer of a copolymer of ethylene and vinyl alcohol between the first polyethylene film and the second polyethylene film; and (c-2) tie layers on both sides of the layer of the copolymer of ethylene and vinyl alcohol; and
   (d) pressing the first polyethylene film and the second polyethylene film together thereby producing the multilayer structure, wherein the first polyethylene film is a multilayered polyethylene film which has been oriented in at least machine direction.

13. The process according to claim 12, further comprising the step of extruding the layer of the copolymer of ethylene and vinyl alcohol at a temperature within the range of from 200° C. to 240° C.

14. The process according to claim 12, further comprising the step of extruding the tie layers at a temperature within the range of about 200° C. to about 280° C.

15. The process according to claim 12, further comprising the step of extruding layers of polyethylene between the first polyethylene film and the tie layer, and the second polyethylene film and the tie layer.

16. The process according to claim 15, further comprising the step of extruding the layers of polyethylene at a temperature within the range of from 275° C. to 330° C.

17. The process according to claim 12, wherein the first polyethylene film is formed from at least three layers.

18. The multilayer structure of claim 1, wherein the first polyethylene layer measured has a tensile modulus at room temperature of at least 1500 MPa.

19. The multilayer structure of claim 1, wherein the multi-layer film consists of a layer A and a layer B,
- wherein layer A is made of a high density polyethylene (HDPE), a medium density polyethylene (MDPE) or a linear low density polyethylene (LLDPE) or blends with high pressure low density polyethylene (LDPE) or with an ethylene based plastomer or a blend of an ethylene based plastomer with high pressure low density polyethylene (LDPE); and
- wherein layer B is made of high density polyethylene (HDPE) having a density of 940 up to 970 kg/m3 or of a medium density polyethylene (MDPE) having a density of 925 up to 940 kg/m3 or a linear low density polyethylene (LLDPE) having a density of 910 up to 950 kg/m3 or blends thereof or with plastomers.

20. The multilayer structure of claim 19, wherein the layer A is HDPE and the layer B is LLDPE.

\* \* \* \* \*